United States Patent Office 3,285,770
Patented Nov. 15, 1966

3,285,770
PROCESS FOR THE TREATMENT OF CELLULOSE TEXTILE MATERIALS WITH HARDENABLE RESIN PRECONDENSATION PRODUCTS AND BRIGHTENING AGENTS
Josef Hegemann, Leverkusen, and Walter Scholermann, Cologne, Germany, assignors to Farbenfabriken Bayer Aktiengesellschaft, Leverkusen, Germany, a corporation of Germany
No Drawing. Filed Aug. 22, 1961, Ser. No. 133,054
Claims priority, application Germany, Aug. 30, 1960, F 32,006
4 Claims. (Cl. 117—33.5)

The present invention relates to a process for the treatment of cellulose textile materials with hardenable resin precondensation products and brightening agents. The process of the invention consists in treating the cellulose textile materials in a single bath simultaneously with the hardenable resin precondensation products and with bis-triazinylaminostilbene compounds corresponding to the general formula

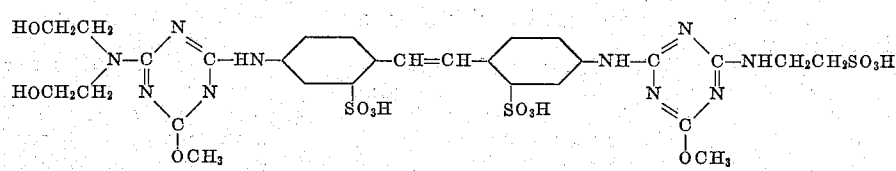

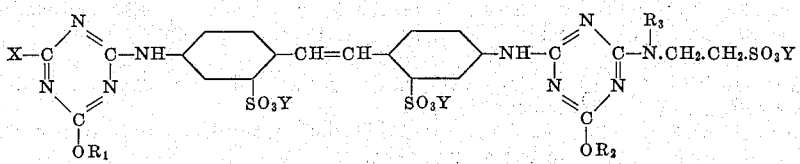

wherein $R_1$ and $R_2$ denote lower alkyl radicals, e.g. the methyl and/or ethyl radical, and $R_3$ means hydrogen or the methyl radical, whilst X stands for the radical of an aliphatic or cycloaliphatic amine and Y denotes hydrogen or a salt-forming ion.

As amines whose radical is represented by X there may be considered for example ammonia, monomethylamine, dimethylamine, monoethanolamine, N-methyl-monoethanolamine, diethanolamine, mono-isopropanolamine, morpholine, piperidine and piperazine, and as hardenable resin precondensation products there may be mentioned for example dimethylol-urea, dimethylolethylene-urea, dimethylol-dihydroxyethylene-urea, tetramethylol-acetylene-diurea, hexamethylol-melamine and their alkyl ethers.

The above hardenable resin precondensation products may be somewhat more specifically described as a hardenable resin precondensation product inclusive of amid-formaldehyde and amine-formaldehyde precondensation products.

Compared with brightening agents hitherto used for the treatment of cellulose textile materials in combination with hardenable resin precondensation products, the bis-triazinyl-aminostilbene compounds proposed according to the invention are distinguished by being substantially more stable in the aqueous solutions containing the hardenable resin precondensation products. It is therefore no longer necessary to carry out the brightening of the cellulose textile materials separately from the treatment with hardenable resin precondensation products; instead, with the use of the proposed bis-triazinylamino-stilbene compounds, it can now take place simultaneously. It is further noteworthy that the reddish tint of the brightening effect generally caused by the compounds to be used according to the invention, compensates, at least partially, the greenish tint frequently occurring when using zinc salts as catalyst in combination with certain reactant resins.

The following examples serve to illustrate the invention without, however, limiting the scope thereof.

Example 1

To 120 g. of a commercial liquid hardenable resin precondensation product based on a dimethylol-triazone is added a solution of 2 g. of the whitening agent in 100 ml. of water and the solution is made up to 900 ml. with condensation water. The mixture is then adjusted to a pH value of 5–5.5 by the addition of acetic acid and a solution of 10 g. of zinc chloride in 100 ml. of water is added. A poplin fabric cut, pre-cleaned and bleached in conventional manner is impregnated with this solution on the foulard and squeezed off to a moisture absorption of about 80%. Subsequently the fabric is dried to a residual moisture of about 10% and, finally, dried at 150° C. for 5 minutes. The fabric, provided in this way with a so-called rapid-iron finish, obtains at the same time an intense neutral white tint.

The brightening agent used in this example can be obtained in the following way:

To 2000 parts by weight of methanol are added 420 parts by weight of sodium bicarbonate and 462 parts by weight of cyanuric chloride, and the mixture is allowed to react with good stirring at room temperature for about 3 hours. 1050 parts by weight of 4-nitro-4'-aminostilbene-disulphonic acid-(2,2') in the form of a 8% aqueous solution of the sodium salt are then run into the reaction mixture which is brought to a temperature of 35–40° C. and allowed to react, until the starting products can no longer be detected.

By the addition of 525 parts by weight of diethanolamine, heating of the reaction mixture to 100° C. while distilling off the methanol, and reducing the reaction solution thus obtained with iron and acetic acid, there is obtained 2-methoxy-4-diethanolamino-1,3,5-triazinyl-6(4,4'-diaminostilbene-disulphonic acid-(2,2').

This amine can either be isolated by precipitation with acid or further processed directly from the solution. This is carried out as follows:

Again, 2000 parts by weight of methanol, 420 parts by weight of sodium bicarbonate and 462 parts by weight of cyanuric chloride are allowed to react with one another as described above and to the reaction mixture obtained are added 1430 parts by weight of 2-methoxy-4-diethanolamine - 1,3,5 - triazinyl-6-(4,4'-diaminostilbene-disulphonic acid-(2,2') in the form of a 8% aqueous solution of the sodium salt, the mixture is allowed to react completely at 35–40° C. as described above and subsequently 625 parts by weight of taurine present in the form of an aqueous solution are added. By heating to 100° C. and distilling off the methanol, the reaction is completed. From the resulting solution the brightening agent can be obtained by crystallising out or by salting out with sodium chloride.

According to another process the brightening agent is obtained as follows:

To 1250 parts by weight of methanol are added 273 parts by weight of sodium bicarbonate and 300 parts by weight of cyanuric chloride, and the mixture is allowed to react with good stirring at room temperature for about 3 hours. 293 parts by weight of 4,4'-diaminostilbene-disulphonic acid-2,2' in the form of a 8% aqueous solution of the sodium salt are then run into the reaction mixture, which is brought to a temperature of 35–40° C. and allowed to react, until the starting product can no longer be detected. By the addition of 170 parts by weight of diethanolamine and 203 parts by weight of taurine in the form of an approximately 20% aqueous solution of the sodium salt and by heating the reaction mixture of 100° C. while distilling off the methanol, the brightening agent used according to the invention is obtained. It can be isolated from the mother liquor by cooling or salting out.

*Example 2*

A padding solution is prepared from 120 g. of a commercial liquid synthetic resin precondensation product based on dimethylol-ethylene urea, an aqueous solution of 2 g. of the brightening agent

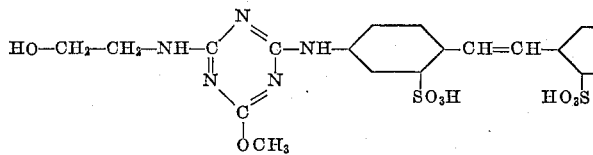

and an aqueous solution of 10 g. of zinc chloride by making up to 1 litre with water. The padding solution is adjusted to a pH value of 5 to 5.5 by the addition of acetic acid. A cotton poplin cut, pre-cleaned and bleached in conventional manner is impregnated with this solution on a foulard, then squeezed off to an absorption of liquor of about 80%, subsequently dried to a residual moisture of about 10% and, finally, condensed at 160° C. for 4 minutes. The fabric has thus obtained a crease resistant finish and shows moreover an intense neutral white shade.

The brightening agent used can be prepared in the manner indicated in Example 1 by applying instead of taurine and diethanolamine the appropriate amounts of methyltaurine and monoethanolamine.

We claim:

1. A cellulose textile material containing a hardenable resin precondensation product selected from the group consisting of an amid-formaldehyde and an amine-formaldehyde and a brightening amount of a compound having the formula

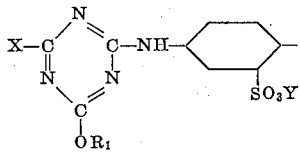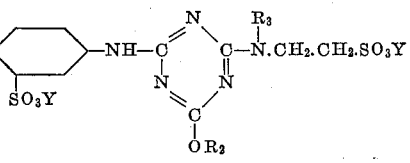

wherein $R_1$ and $R_2$ are lower alkyl; $R_3$ is a member selected from the group consisting of hydrogen and methyl; X is a member selected from the group consisting of an aliphatic and a cycloaliphatic amine; and Y is a member selected from the group consisting of hydrogen and a salt-forming ion.

2. A process for treating cellulose textile material comprising contacting said material with a treating bath containing a hardenable resin precondensation product selected from the group consisting of an amid-formaldehyde and an amine-formaldehyde and a brightening amount of a compound having the formula

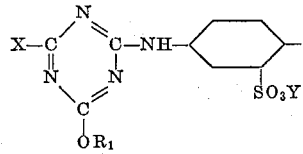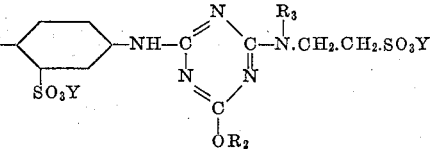

wherein $R_1$ and $R_2$ denote lower alkyl; $R_3$ is a member selected from the group consisting of hydrogen and methyl; X is a member selected from the group consisting of aliphatic amine and cycloaliphatic amine; and Y is a member selected from the group consisting of hydrogen and a salt forming ion.

3. The process of claim 2 wherein X stands for a lower hydroxyalkyl amine.

4. The process of claim 2 wherein the bis-triazinyl-aminostilbene compound has the formula

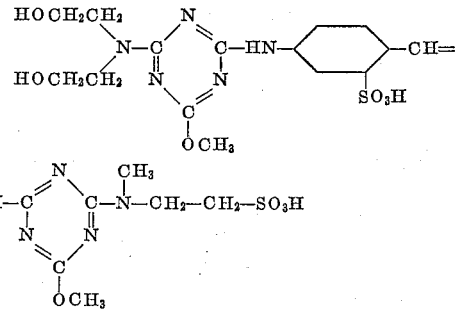

References Cited by the Examiner

UNITED STATES PATENTS 2,846,397 8/1958 Ackermann.
3,018,287 1/1962 Fleck.

WILLIAM D. MARTIN, *Primary Examiner.*

RICHARD D. NEVIUS, T. G. DAVIS,
*Assistant Examiners.*